United States Patent
Heaney et al.

(10) Patent No.: US 7,477,443 B2
(45) Date of Patent: Jan. 13, 2009

(54) DISORDERED THREE-DIMENSIONAL PERCOLATION TECHNIQUE FOR FORMING ELECTRIC PAPER

(75) Inventors: Michael B. Heaney, Palo Alto, CA (US); Gregory P. Schmitz, Los Gatos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 874 days.

(21) Appl. No.: 10/927,691

(22) Filed: Aug. 27, 2004

(65) Prior Publication Data

US 2006/0046036 A1  Mar. 2, 2006

(51) Int. Cl.
*G02B 26/00* (2006.01)
(52) U.S. Cl. .................................... 359/296
(58) Field of Classification Search ................ 359/296; 345/84, 858, 648, 105, 107, 108, 109
See application file for complete search history.

(56) References Cited

U.S. PATENT DOCUMENTS

| | | | |
|---|---|---|---|
| 4,126,854 A | 11/1978 | Sheridon | |
| 5,334,330 A | 8/1994 | Rowlette | |
| 5,389,945 A | 2/1995 | Sheridon | |
| 5,723,204 A | 3/1998 | Stefik | |
| 6,222,513 B1 | 4/2001 | Howard et al. | |
| 6,235,395 B1 | 5/2001 | Sacripante et al. | |
| 6,265,466 B1 | 7/2001 | Glatkowski et al. | |
| 6,778,198 B2 * | 8/2004 | Dances | 347/148 |
| 7,139,114 B2 * | 11/2006 | Schmitz et al. | 359/296 |
| 7,265,894 B2 * | 9/2007 | Schmitz | 359/296 |
| 2002/0099114 A1 | 7/2002 | Nakayoshi et al. | |
| 2002/0102385 A1 | 8/2002 | Kuhl et al. | |
| 2005/0134552 A1 | 6/2005 | Schmitz et al. | |

OTHER PUBLICATIONS

Paul J. Glatkowski, "Carbon Nanotube Based Transparent Conductive Coatings," Eikos Inc., www.eikos.com, (updated at least as of Jun. 2, 2003).
Michael B. Heaney, "Measurement And Interpretation Of Nonuniversal Critical Exponents In Disordered Conductor-Insulator Composites," The American Physical Society, Physical Review B, vol. 52, No. 17, pp. 12477-12480, Nov. 1, 1995.
Michael B. Heaney, "Imaging and Electrical Resistivity Measurements of Disordered Carbon-Black-Polymer Composites," American Chemical Society, pp. 8-29 (1999).

* cited by examiner

*Primary Examiner*—Hung X Dang
*Assistant Examiner*—Tuyen Q Tra
(74) *Attorney, Agent, or Firm*—Fay Sharpe LLP

(57) ABSTRACT

An electric paper apparatus comprised of a single sheet of components, and a method of forming same, are provided. The single layer includes display elements, such as bi-stable pixel structures, and conductive particles, both preferably embedded in an insulating matrix of material (e.g. non-conductive particles). The display elements, or bi-stable pixel structures, take the exemplary form of microencapsulated bichromal spheres. The conductive particles serve as both conductive islands and as a ground plane. In this regard, the conductive particles form a discontinuous random pattern of conductive islands on one side of the sheet, and a continuous electrically conductive percolative network, or ground plane, on the other side of the sheet. This is accomplished by varying the effective percolation threshold across the thickness of the sheet. Doing so will provide particles on one side that are below the percolation threshold (e.g. the conductive islands) while the particles on the other side (e.g. the ground plane) are above the percolation threshold.

17 Claims, 7 Drawing Sheets

DISORDERED THREE-DIMENSIONAL PERCOLATION TECHNIQUE FOR FORMING ELECTRIC PAPER

BACKGROUND

The present exemplary embodiment relates to the use of electronic display materials for electric paper applications. It finds particular application in rendering electric paper applications more flexible and more cost effective by providing a single disordered percolation layer forming a sheet of electric paper, and will be described with particular reference thereto. However, it is to be appreciated that the present exemplary embodiment is also amenable to other like applications.

By way of background, electric paper can be defined as any electronically-addressable display medium that approximates paper in form and function. To be most versatile, electric paper should be light-weight, thin and flexible, and it should display images indefinitely while consuming little or no power. In addition, electric paper should be reusable. One must be able to erase images and create new ones repeatedly. Preferably, electric paper should display images using reflected light and allow a very wide viewing angle.

One way to make electric paper possible using traditional electronic display technology is to completely remove the driving electronics from an electronic display package and use external addressing electrodes to write and erase images. This approach both reduces the per unit cost of electric paper sheets and enables the use of cheap, flexible plastic films in place of glass plates for packaging. Multiple electric paper sheets can then be addressed by a single set of external driving electronics, much like multiple sheets of pulp paper are printed on by a single printer.

A known sheet and display system, dubbed Gyricon, is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g., 100 micrometers) in diameter that serve as display elements. Each rotating display element has halves of contrasting colors, such as a white half and a black half. Each bichromal rotating element also has an electric dipole moment, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the magnitude and polarity of the electric fields.

FIG. 1 shows a representation of a Gyricon sheet comprised of a plurality of bichromal rotating elements, or display elements, cast in a retaining medium, or media plane, 200. It is contained between a first encapsulating layer, or image plane, 202 and a second encapsulating layer 204. The sheet 200 and encapsulating layers 202, 204 are placed in proximity to a supporting back plane 206 that is electrically grounded. The layer 204 and plane 206 comprise a ground plane. An external addressing device 208 connected to a power supply 210 is depicted moving across the sheet in a direction D. Each bichromal sphere, or display element, 220, 226, 232 is contained in its own liquid-filled cavity 221, 227, 233 within the retaining medium 200. An electric field exists directly between the external addressing device 208 and the equipotential surface 206 that causes the local bichromal sphere 226 to rotate.

To improve performance, more recent embodiments of these sheets advantageously incorporate charge-retaining islands thereon. U.S. Pat. No. 6,222,513 B1, issued Apr. 24, 2001 and entitled "Charge Islands for Electric Paper and Applications Thereof" describes electric paper having these features. Turning now to FIG. 2, an exemplary Gyricon sheet of this type is shown. The Gyricon sheet is comprised of the following elements: a sheet 300, a first encapsulating layer 302 patterned with conductive charge-retaining islands 306, and a second encapsulating layer 304 that may or may not be patterned with charge-retaining islands.

Together, the first encapsulating layer 302 and the second encapsulating layer 304 do the following things: indefinitely contain a sheet 300, provide at least one transparent window through which the sheet 300 can be viewed, and provide at least one external surface patterned with charge retaining islands 306 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, doctoring, or some other method to hold the contents of the sheet 300.

FIG. 2 also shows a pattern for the charge retaining islands 306 of the outer surface of the first encapsulating layer 302. Charge-retaining islands 306 have square perimeters and are organized in a regular two-dimensional array. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material.

FIG. 3 simply illustrates a second possible embodiment of a charge-retaining island pattern that utilizes a random array of islands. The top view of the first encapsulating layer 400 shows randomly shaped and oriented charge retaining islands 404 separated by channels 402. The fraction of surface area covered by charge retaining islands 404 must still be relatively large compared to that of the channels 402, but in such a random distribution, both feature sizes must be much smaller than the pixel size of a displayed image.

The charge retaining islands can be created on or in an encapsulating layer by many means with any conductive material. One technique, which has been tested, creates islands of conductive and transparent Indium Tin Oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester. Another technique, called Flexography, has also been used to form these island structures on electric paper configurations.

However, the use of conductive islands, while a good solution to many problems involving electric paper, presents other difficulties. First, producing the conductive islands by the technique above and other techniques can be difficult and costly. Second, because the conductive islands are typically disposed in a regular pattern, undesired Moiré patterns are developed in the image.

An alternative technique for providing conductivity to the surface of electric paper structure has been developed and described in a commonly assigned and co-pending patent application bearing U.S. Ser. No. 10/739,809, filed Dec. 18, 2003, entitled "Disordered Percolation Layer for Forming Conductive Islands on Electric Paper," and naming Gregory P. Schmitz and Michael B. Heaney as inventors. This alternative approach includes providing an electric paper application including a charge retention layer formed from a disordered mixture of conductive and non-conductive particles. In one form, as shown in FIG. 4, the disordered mixture is attached to a non-conductive surface. For example, randomly mixed and pre-measured amounts of non-conductive particles (e.g., 10 micrometer glass spheres) with conductive particles (e.g., 10 micrometer silver-coated glass spheres) are sprinkled onto a flexible plastic film. The film is coated with adhesive to retain the particles. This film is then joined to the rest of the electric paper structure as an image plane, or encapsulating layer. In another form, as shown in FIG. 5, the randomly pre-mixed amounts of conductive and non-conductive particles are sprinkled directly onto a smooth and sticky layer of the media plane of electric paper. This form provides the advantages noted above as well as the additional advantage that any voltage applied to a conductive island will substantially appear at the surface of the media plane with negligible voltage drop.

In either form, if the relative fractions of conductive and non-conductive particles within the disordered mixture are below a percolation threshold (which can be calculated and measured), then randomly located and shaped conductive islands (comprised of one or more of the silver-coated glass spheres) will be formed. This structure of adhered particles replaces the above-noted conductive island layers formed using photolithographic patterning of ITO films deposited on flexible plastic sheets and other techniques.

The disordered three-dimensional percolation technique described above provides clear advantages over that which had been previously known, particularly with respect to flexibility of the paper. However, many of the shortcomings of the previous approaches, such as those described in connection FIGS. 1-3, remain. For example, the presence of multiple layers in this configuration is a limiting factor in providing improved flexibility. Moreover, each of the multiple layers may have its own unique formation process, e.g. vacuum deposition, photolithography, . . . etc. This could result in complex and costly processing steps.

The present application resolves these difficulties and others.

BRIEF DESCRIPTION

In accordance with one aspect of the present exemplary embodiments, the apparatus comprises conductive particles, nonconductive particles and display elements, wherein the conductive particles, nonconductive particles and the display elements are randomly positioned in an extruded sheet such that a first ratio of the conductive particles to at least one of the nonconductive particles and the display elements in a first region associated with a first surface of the sheet is below a percolation threshold and a second ratio of the conductive particles to at least one of the nonconductive particles and the display elements in a second region associated with a second surface of the sheet is above the percolation threshold.

In accordance with another aspect of the present exemplary embodiments, the conductive particles comprise carbon nanotubes.

In accordance with another aspect of the present exemplary embodiments, the conductive particles comprise Indium Tin Oxide (ITO) particles.

In accordance with another aspect of the present exemplary embodiments, the nonconductive particles comprise transparent material.

In accordance with another aspect of the present exemplary embodiments, the nonconductive particles comprise polymer material.

In accordance with another aspect of the present exemplary embodiments, the nonconductive particles comprise elastomer material.

In accordance with another aspect of the present exemplary embodiments, the display elements are bi-stable and comprise microencapsulated elements that are responsive to electric fields.

In accordance with another aspect of the present exemplary embodiments, the display elements comprise microencapsulated bichromal spheres.

In accordance with another aspect of the present exemplary embodiments, the conductive particles at the first surface of the sheet are operative as charge retaining islands.

In accordance with another aspect of the present exemplary embodiments, at least some of the conductive particles in the second region of the sheet form a conductive matrix and are operative as a ground plane.

In accordance with another aspect of the present exemplary embodiments, method of forming an electric paper apparatus comprises mixing conductive particles, nonconductive particles and display elements in selected amounts to obtain a mixture of disordered particles, extruding the mixture into a sheet and processing the sheet such that first and second ratios of the conductive particles to at least one of the nonconductive particles and the display elements are obtained, the first ratio of the conductive particles to the at least one of the nonconductive particles and the display elements, in a first region associated with a first surface of the sheet, being below a percolation threshold and a second ratio of the conductive particles to the at least one of the nonconductive particles and the display elements, in a second region associated with a second surface of the sheet, being above the percolation threshold.

In accordance with another aspect of the present exemplary embodiments, the method further comprises calculating the selected amounts.

In accordance with another aspect of the present exemplary embodiments, the selected amounts are calculated so that an amount of the conductive particles is below the percolation threshold.

In accordance with another aspect of the present exemplary embodiments, the processing comprises controlling a temperature gradient to allow the second surface of the sheet to cool more slowly than the first surface of the sheet to form the second region.

In accordance with another aspect of the present exemplary embodiments, the processing comprises cooling the first surface of the sheet and the second surface of the sheet at substantially the same rate and applying pressure to the second surface of the sheet to form the second region.

In accordance with another aspect of the present exemplary embodiments, the selected amounts are calculated so that an amount of the conductive particles is above the percolation threshold.

In accordance with another aspect of the present exemplary embodiments, the extruded sheet includes a conductive matrix of the conductive particles and the processing comprises cooling the first surface of the sheet and the second surface of the sheet at substantially the same rate to temporarily maintain the conductive matrix in the sheet and coating the first side of the sheet with a plasticizer to selectively swell the sheet to form the first region by breaking the conductive matrix therein.

DETAILED DESCRIPTION

In accordance with the presently described embodiments, an improved electric paper application is realized. More specifically, an electric paper structure according to the presently described embodiments is formed as a single layer, or sheet, of relatively disordered particles that comprise the elements that heretofore were separated as uniquely formed layers in electric paper structures. In this regard, as noted above, conventional electric paper applications include a variety of elements, typically separated into the aforementioned layers. For example, a prior structure may include a layer having bi-stable pixels disposed therein, a layer supporting charge retaining islands of some form, and a layer serving as a ground plane.

In the presently described embodiments, these three elements are provided in the single layer of particles noted above. The single layer includes display elements, such as bi-stable pixel structures, and conductive particles, both preferably embedded in an insulating matrix of material (e.g. non-conductive particles). The display elements, or bi-stable pixel structures, take the exemplary form of microencapsulated bichromal spheres. The conductive particles serve as both conductive islands and as a ground plane.

In this regard, the conductive particles form a discontinuous random pattern of conductive islands on one side of the sheet, and a continuous electrically conductive percolative network or matrix, or the ground plane, on the other side of the sheet. This is accomplished by varying the effective percolation threshold across the thickness of the sheet. That is, particle ratios on one side of the sheet are below the percolation threshold (e.g. forming the conductive islands) while the particle ratios on the other side are above the percolation threshold (e.g. forming the ground plane).

This effect is common in the extrusion of disordered conductive particle/polymer composites, and is controllable. As will be discussed in further detail below, a known technique to achieve this gradation of percolation threshold is to allow the top surface to pass through a melt transition more rapidly than the bottom surface. Other such techniques include the use of a plasticizer and the use of pressure techniques. Notably, complex and/or costly formation techniques, such as vacuum processing, photolithography and thin film deposition, are avoided.

Figure 1:
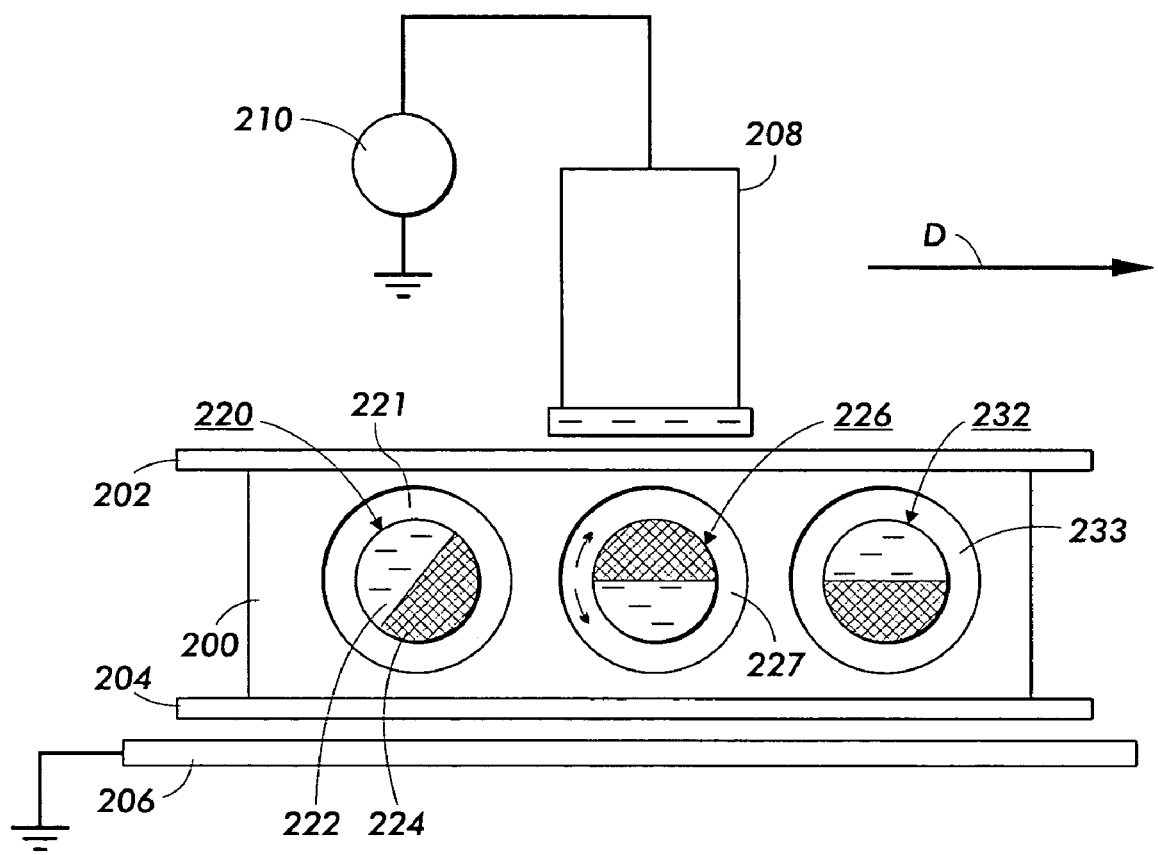
FIG. 1 is a cross-sectional view of a portion of a prior art electric paper configuration.
Figure 2:
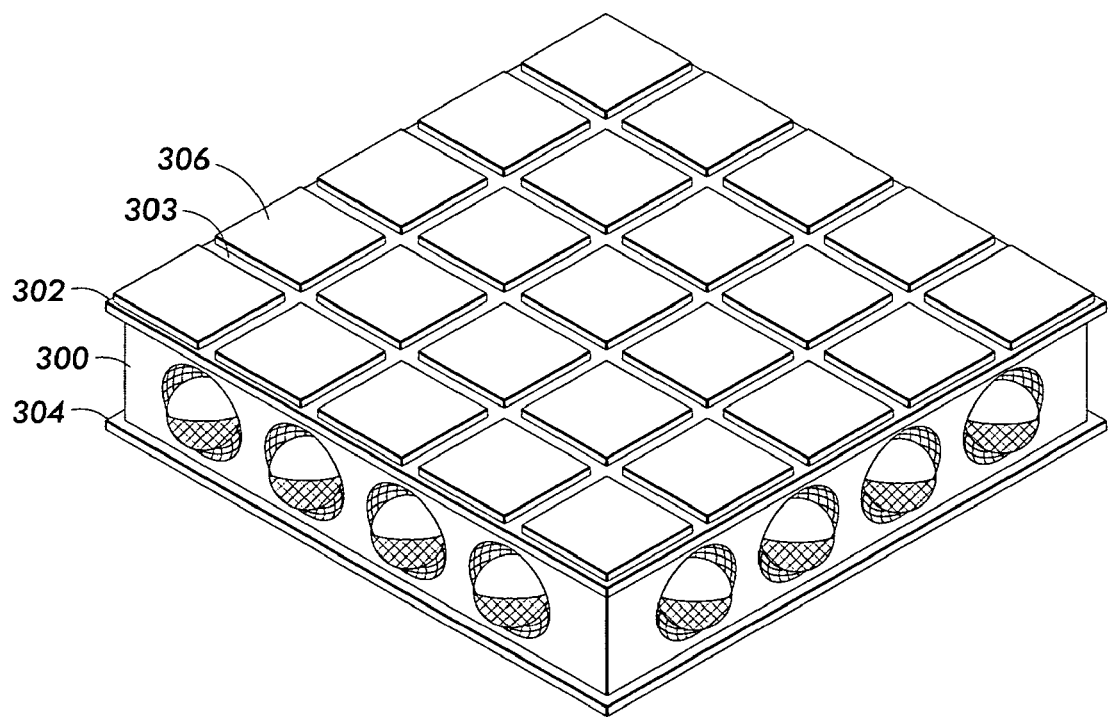
FIG. 2 is a perspective view of a prior art electric paper configuration.
Figure 3:
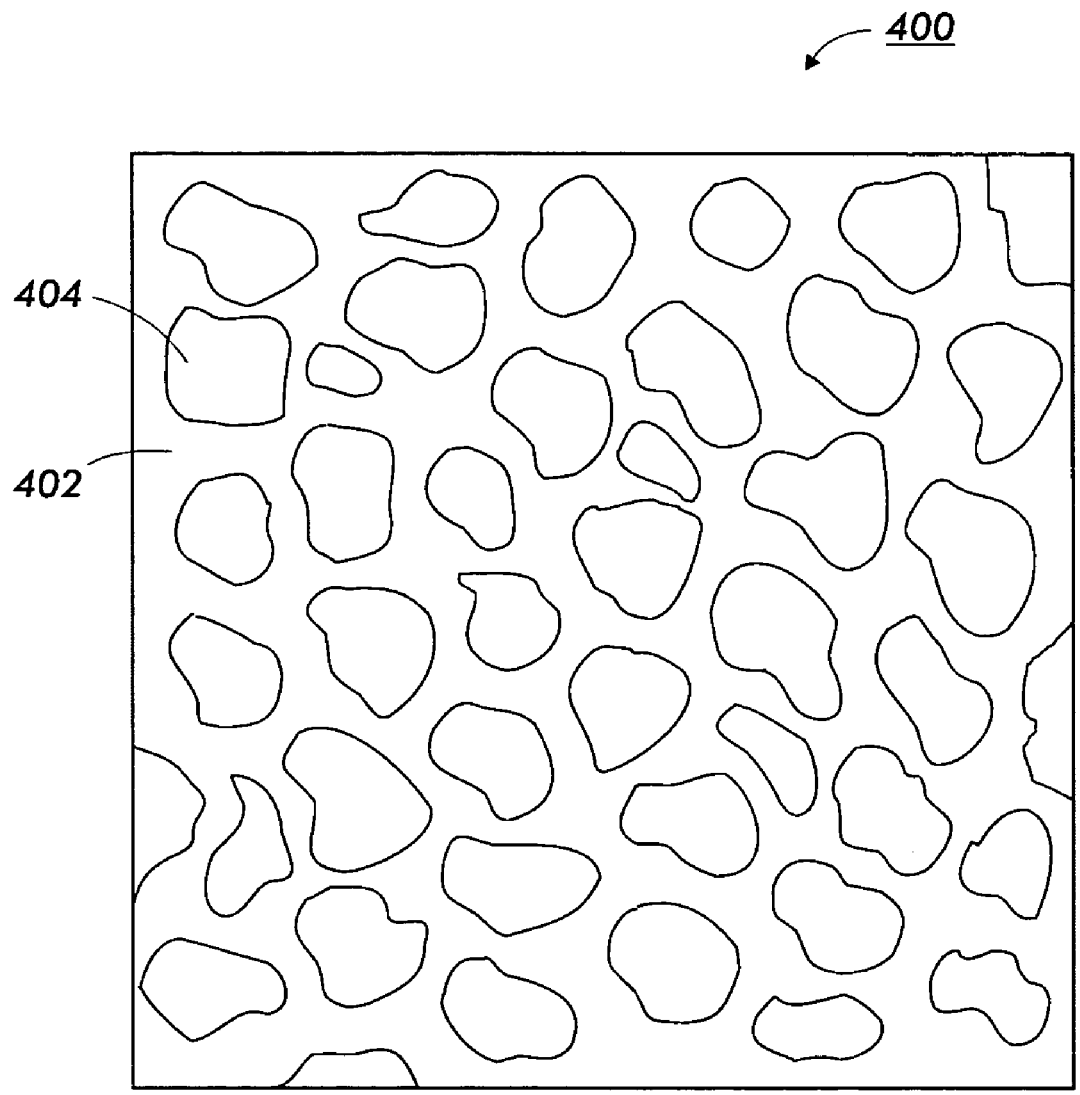
FIG. 3 is a top view of a prior art electric paper configuration.
Figure 4:
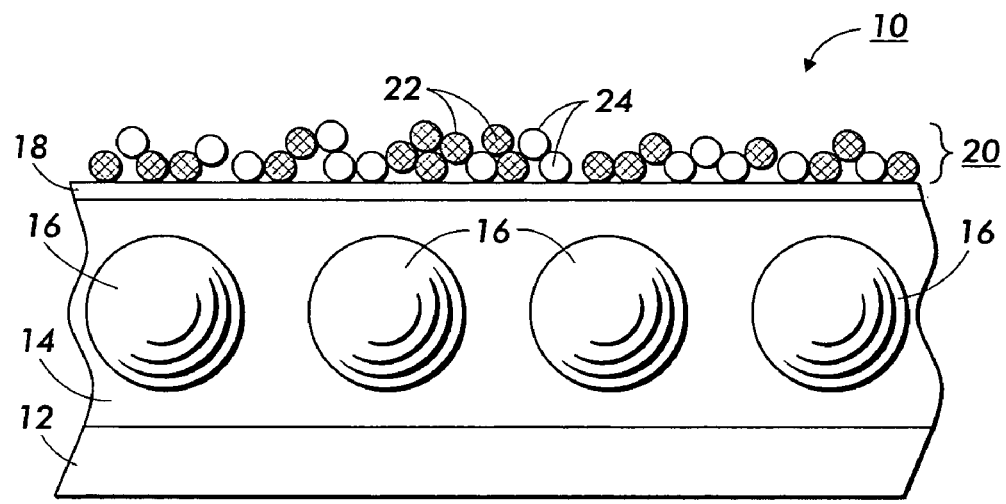
FIG. 4 is a cross-sectional view of a portion of a prior art electric paper configuration.
Figure 5:
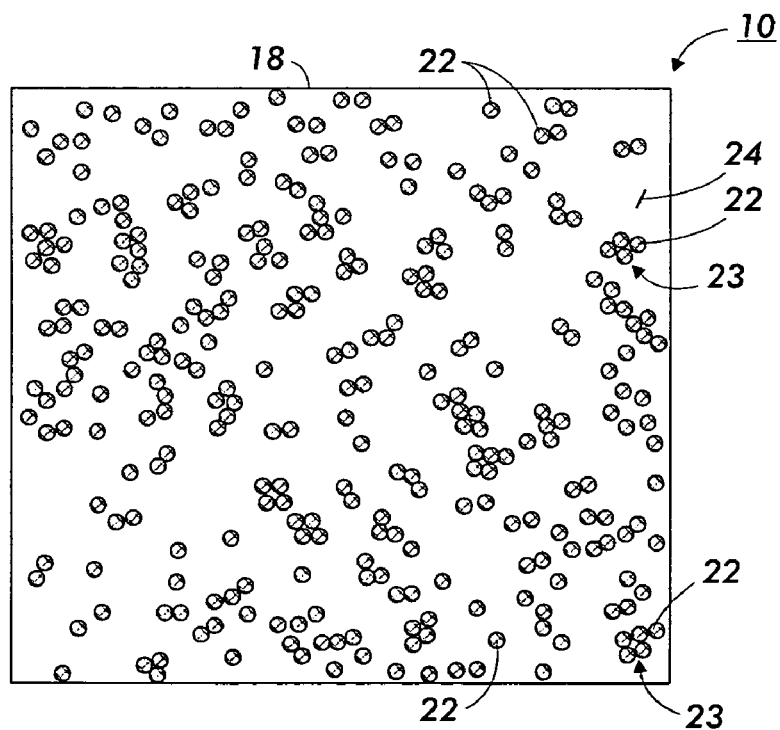
FIG. 5 is a cross-sectional view of a portion of a prior art electric paper configuration.
Figure 6:
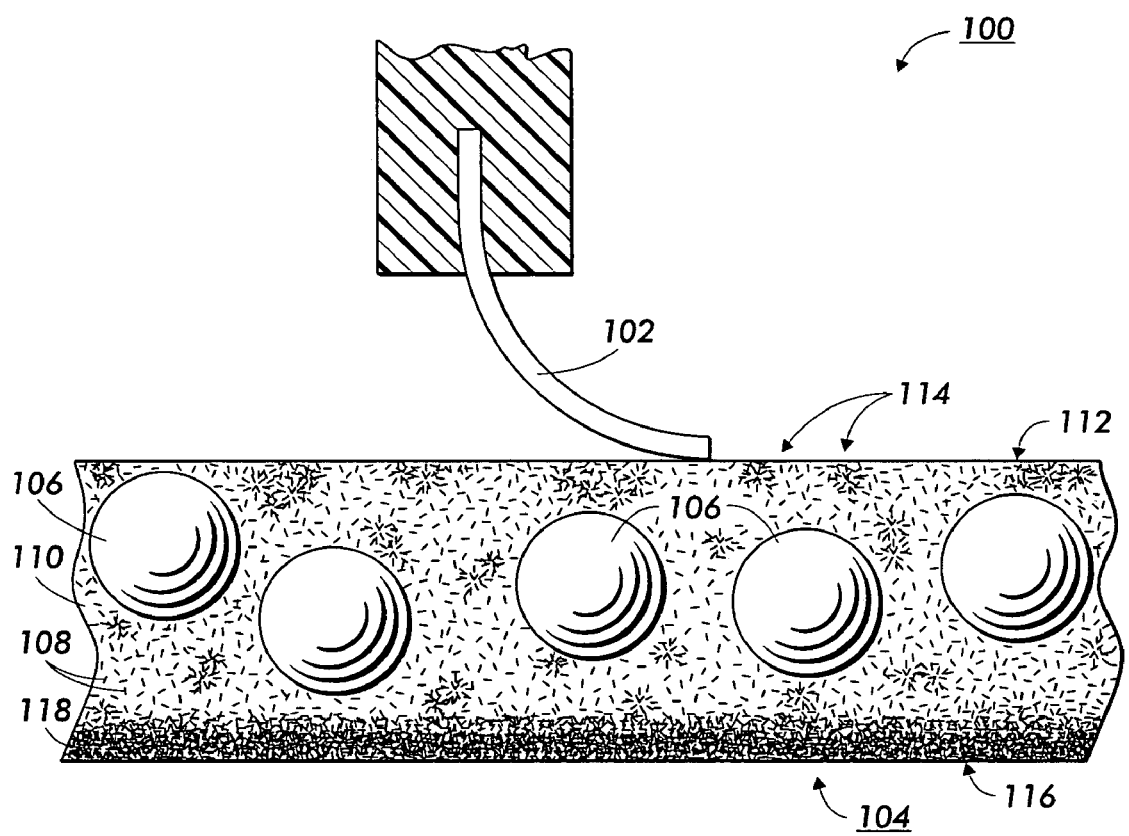
FIG. 6 is a cross-sectional view of a presently described embodiment of an electric paper configuration.

With reference to FIG. 6, an electric paper structure 100 is illustrated in conjunction with a print head 102. The print head 102 may take any form that is suitable for use with electric paper applications; however, electric paper structure 100 takes the form of a sheet 104 comprised of a variety of elements that are mixed and then extruded into a sheet, as noted above. These elements include display elements 106, conductive particles 108, and non-conductive particles, or insulative material, 110.

The display elements 106 may take a variety of forms but, in one embodiment, display elements 106 are bi-stable pixel elements such as microencapsulated bichromal spheres, which are known in the field. Any electric rotating sphere, electrophoretic particles, liquid crystal droplets, etc. may be used to form a display or media plane. The display elements may also each comprise a plurality of display particles housed within a single microencapsulated structure. Any of these forms, or other suitable forms, may be used in connection with the presently disclosed embodiments of electric paper provided that the display elements are reactive to electric field to facilitate electric printing as described above.

It should also be understood that, while the display elements are shown as being much larger that the conductive and non-conductive particles for ease of illustration, such difference in particle size may not be desired. For example, for improved resolution, the size of the display element should be approximately the same size as the conductive particles. This will allow one conductive particle, or island, to control no more than one display element. If the conductive particles are significantly larger than the display elements, the conductive particles may be able to control more than one display element. As such, the resolution will be dictated by the size of the conductive particle or island—which is not typically desired.

In addition, the display elements are shown as being in a particular configuration within the sheet, for ease of explanation. However, in the contemplated mixture, it should be understood that these display elements (as well as other particles in the mixture) will be randomly distributed and will likely take on different random configurations for different implementations.

The conductive particles 108 may take a variety of suitable forms. In the embodiments described herein, the conductive particles are transparent (or will cure to a transparent form). For example, the conductive particles 108 may be embodied in carbon nanotube structures. Such nanotube structures are known to those in the field. An example of one suitable structure is described in P. J. Glatkowski, "Carbon Nanotube Based Transparent Conductive Coatings," www.eikos.com (updated at least as of Jun. 2, 2003), and in U.S. Pat. No. 6,265,466 B1, both of which are incorporated herein by reference. Carbon nanotubes are a suitable candidate for the conductive particles because such structures can be relatively transparent and have a low percolation threshold and also allow a more transparent medium. In this way, a mixture using carbon nanotube structures, as opposed to other conductive particles, will require less of these structures to reach the percolation threshold. Thus, properties of other substances with which the nanotubes may be mixed are not greatly impacted by the nanotubes. Consequently, carbon nanotubes are used to make thin, transparent and flexible film. In addition, carbon nanotubes typically exhibit high electrical and thermal conductivity, high strength, and high strain to failure.

The conductive particles 108 may also take the form of Indium Tin Oxide (ITO) particles. These particles may be formed by pulverizing ITO material into appropriately sized particles.

Of course, variations of these forms of particles may also be used. For example, the size of the particles may vary. Moreover, the shape of the particles may vary, provided that the selected shape is conducive to conductivity and the random formation of charge retaining islands. As is known, the charge retention layer is useful to hold electric charge near the display elements.

The non-conductive particles, or insulative material, 110 may likewise take a variety of suitable forms. For example, the non-conductive particles may be made from polymer material. Similarly, such particles may be formed from elastomer or rubber material. Of course, the non-conductive material is transparent (or will cure to a transparent form) in the embodiments described herein. In some embodiments, the non-conductive material may also resemble paper in its look and feel.

As shown, a mixture of these elements forms a discontinuous conductive matrix on one side 112 of the sheet 104 which also serves to provide conductive islands 114 to the sheet. In addition, the mixture of elements forms a continuous conductive matrix on an opposite side 116 of the sheet. The continuous conductive matrix serves as the ground plane 118 for the electric paper structure.

The conductive particles, nonconductive particles and the display elements are randomly positioned in the extruded sheet 104 such that a first ratio of the conductive particles 108 to at least one of the nonconductive particles 110 and the display elements 106 in a first region associated with a first surface of the sheet 104 is below a percolation threshold. This forms the aforementioned conductive islands 114. In addition, a second ratio of the conductive particles 108 to at least one of the nonconductive particles 110 and the display elements 106 in a second region associated with a second surface of the sheet 104 is above the percolation threshold. This, of course, forms the continuous conductive matrix serving as the ground plane 118. At least some of the conductive particles in this region form the conductive matrix.

In this type of configuration, the amount of the conductive particles relative to non-conductive particles (and, in some cases, the display elements) is calculated to ensure a suitable distribution of the particles within the sheet. It should be understood that, depending on the number of display elements used, the display elements may or may not need to be included in the calculation. Where the number of display elements is negligible relative to the number of conductive and non-conductive particles, the display elements may be excluded from the calculation. Conversely, the number of display elements should be included in the calculation where the display elements have an impact on the conductive matrix formed in the sheet (if the percolation threshold is reached).

The determination of the amount of the conductive particles relative to at least one of the non-conductive particles and the display elements is accomplished to obtain a value that is either above or below a percolation threshold for the particles as applied to the electric paper—depending, as will be explained below, on the post-extrusion processes that are used to create the percolation threshold gradient noted above. If the value calculated is below the percolation threshold, the conductive particles, or charge retaining islands, will be electrically isolated from one another by the non-conductive material during the extrusion process. So, the mixture of the particles within the resultant sheet will merely contain random conductive islands. If the value calculated is above the percolation threshold, a continuous conductive path will be formed throughout the sheet during the extrusion process.

The determination of this value of conductive particles can be accomplished using well known percolation theory and experiments. See, e.g., Zallen, R., *The Physics of Amorphous Solids*, John Wiley & Sons, New York, N.Y. (1983); Sahimi, M., *Applications of Percolation Theory*, Taylor & Francis, Bristol, Pa. (1994); and, Stauffer, D., and Aharony, A., *Introduction to Percolation Theory*, second edition, Taylor & Francis, Bristol, Pa. (1991), all of which are incorporated herein by reference.

Also, the following calculation may be used to calculate the average conductive island size $\xi$:

$$\xi = \xi_o \left[ \frac{(p_c - p)}{(1 - p_c)} \right]^{-\nu}$$

where $\xi$ is the correlation length, $\xi_0$ is the correlation length scale factor, $p_c$ is the percolation threshold, p is the volume fraction of conductive particles and $\nu$ is the correlation length critical exponent. This is described in more detail in Heaney, M. B., "Measurement and Interpretation of Non-universal Critical Exponents in Disordered Conductor-Insulator Composites," Physical Review B, v. 52, no. 17, pages 12477-12480 (1995), which is incorporated herein by reference. For conducting and insulating spheres in a randomly closed pack distribution, $p_c$=0.45 (in two dimensions) and $p_c$=0.16 (in three dimensions). See also, Heaney, M. B., "Imaging and Electrical Resistivity Measurements of Disordered Carbon-Black-Polymer Composites," in *Semiconducting Polymers: Applications, Properties, and Synthesis*, edited by B. R. Hsieh and Y. Wei, pages 8-29 (1999), which is incorporated herein by reference.

Figure 7:
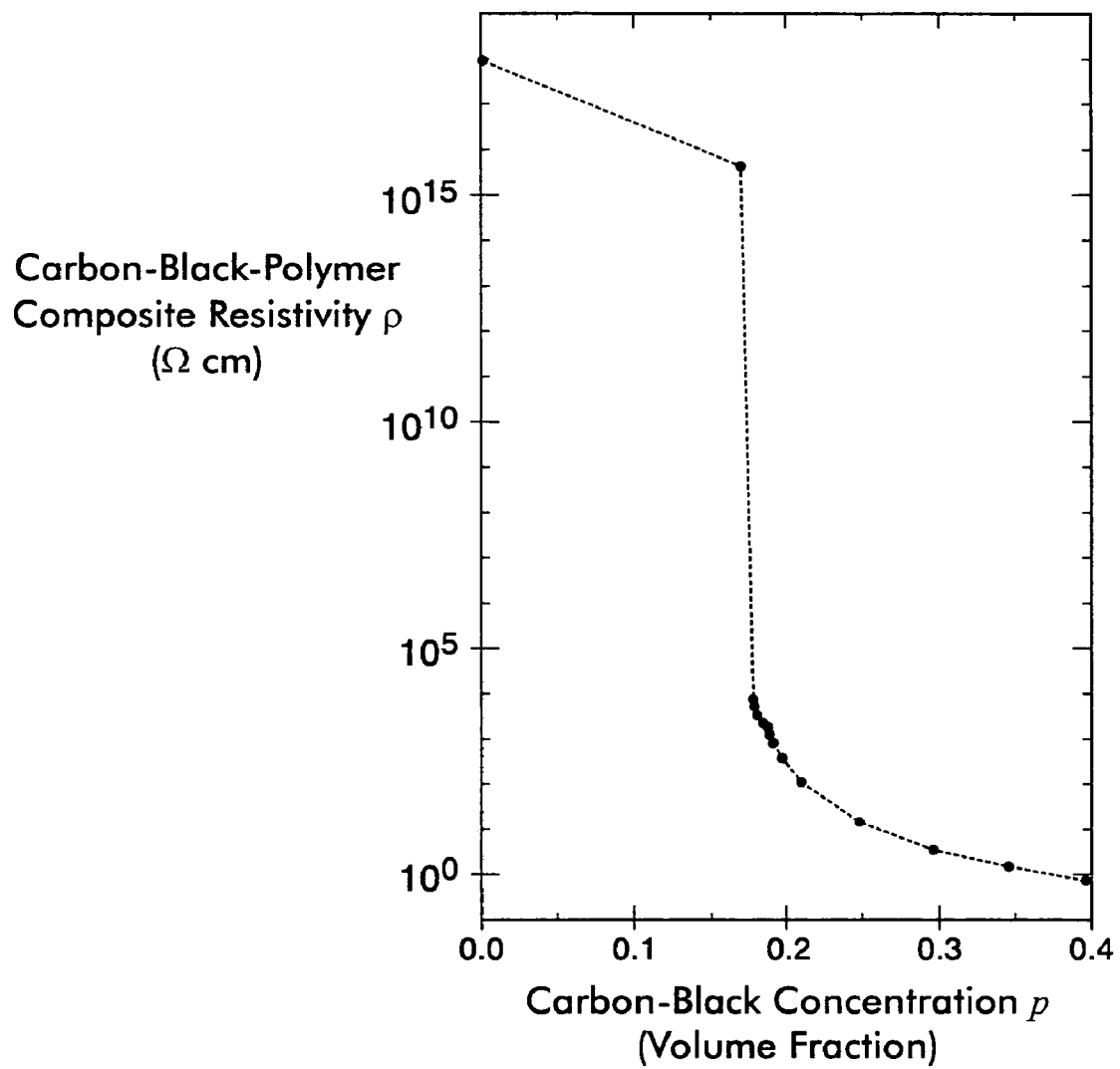
FIG. 7 is a graph illustrating a percolation threshold.

The impact of calculating proper amounts of material is observed in FIG. 7. As shown, the resistivity of any mixture of components (e.g. the carbon-black-polymer composite shown), changes dramatically at the percolation threshold. In this example, the bulk dc resistivity of a carbon-black-polymer composite versus the carbon-black concentration, measured at room temperature, is illustrated. The percolation threshold occurs at a carbon-black concentration of p=0.17. The dashed line connects adjacent data points, and has no other physical significance. These phenomena are accentuated with the use of carbon nanotubes as a conductive material. In this regard, carbon nanotubes have a low percolation threshold. So, the change is more dramatic than is shown for the carbon-black-polymer composite.

Once the appropriate amounts of display elements, conductive particles, and insulative material (or non-conductive particles) are determined, these components are combined and mixed randomly. This, of course, can be accomplished any of a variety of mixing techniques, provided that the final mixture consists of a random distribution of components.

The mixture is then extruded into a sheet. Any suitable extrusion process may be implemented. Of course, a determining factor in selection of extrusion processes may be the post-extrusion processes that are implemented.

As noted, after (or during, depending on the precise process selected) extrusion, the sheet 104 is treated or processed to achieve the desired percolation gradation. That is, the sheet is treated or processed such that first and second ratios of the conductive particles 108 to at least one of the nonconductive particles 110 and the display elements 106 are obtained. The first ratio of the conductive particles 108 to the at least one of the nonconductive particles 110 and the display elements 106, in a first region associated with a first surface 112 of the sheet 104, is below the percolation threshold. The second ratio of the conductive particles 108 to the at least one of the nonconductive particles 110 and the display elements 106, in a second region associated with a second surface 116 of the sheet 104, is above the percolation threshold.

To achieve the desired differential in percolation threshold between different regions of the extruded sheet, a variety of techniques may be used. For example, the selected amounts of conductive particles, display elements, and non-conductive particles may be calculated so that an amount of the conductive particles is below the percolation threshold. The processing then entails controlling a temperature gradient to allow the second surface of the sheet to cool more slowly than the first surface of the sheet to form the second region. It has been observed that if the second surface cools more slowly, the non-conductive particles such as polymer particles have more time to establish denser structures. This will, in turn, result in a more dense distribution of conductive particles—and a different percolation threshold. The temperatures selected for the process should be such that the second region becomes a conductive matrix. Therefore, the sheet will have different percolation thresholds for different regions of the sheet.

Alternatively, if the selected amount or concentration of conductive particles is below the percolation threshold, the processing may entail cooling the first surface of the sheet and the second surface of the sheet at substantially the same rate and applying pressure to the second surface of the sheet to form the second region. Application of pressure will in turn result in a more dense distribution of conductive particles.

As a further example, the selected amounts may be calculated so that an amount or concentration of the conductive particles is above the percolation threshold. Accordingly, the extruded sheet will have a conductive matrix throughout its volume. In this case, the processing may include cooling the first surface of the sheet and the second surface of the sheet at substantially the same rate to temporarily maintain the conductive matrix in the sheet, and then coating the first side of the sheet with a plasticizer. The plasticizer will swell the sheet, where absorbed, to form the first region by breaking the conductive matrix therein. It will be appreciated that this process will also result in different percolation thresholds for different regions of the sheet.

Figure 8:
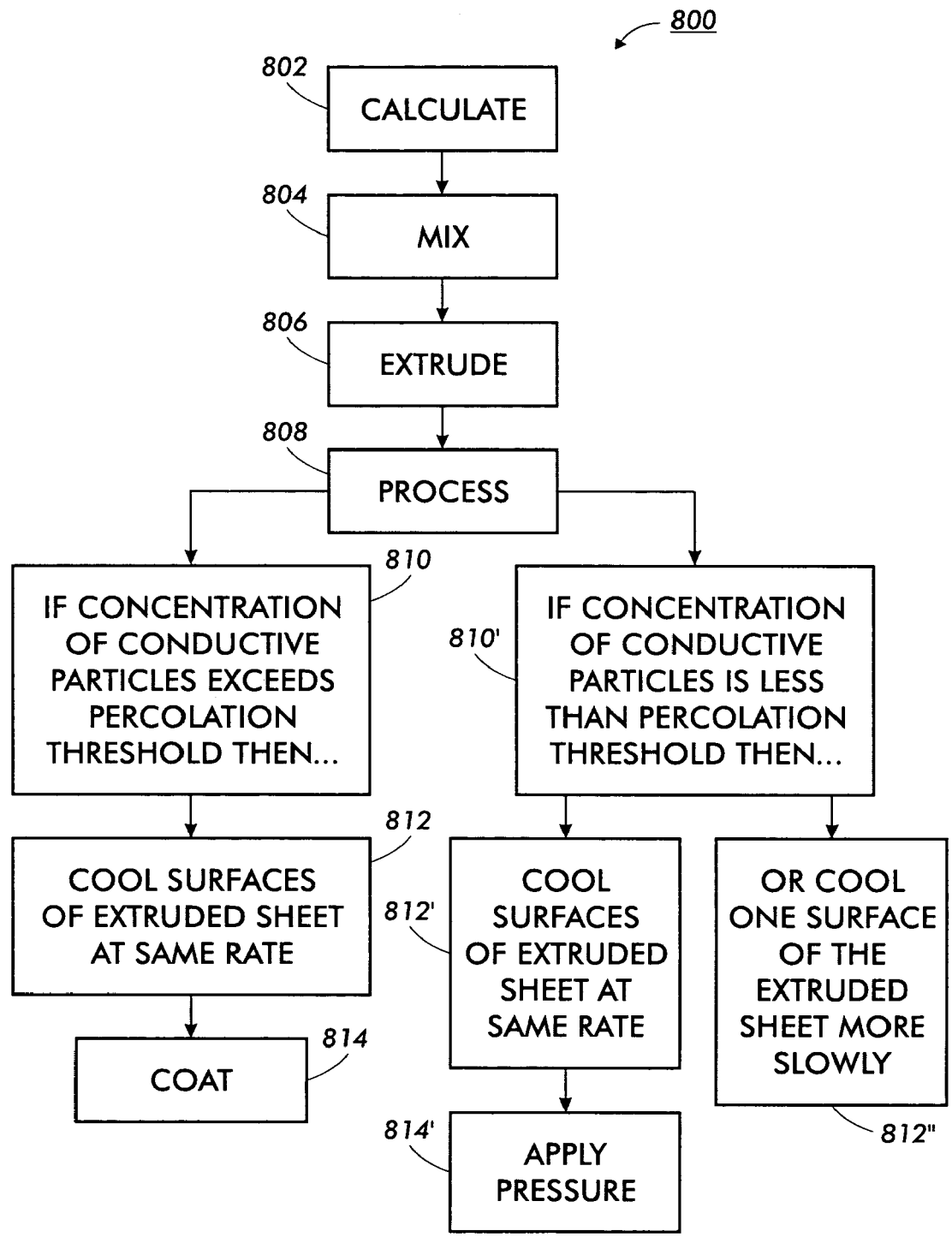
FIG. 8 is a flow chart illustrating a process according to a presently described embodiment.

In this regard, FIG. 8 illustrates these exemplary processes. As shown, a process 800 for achieving the desired differential in percolation threshold between different regions of the extruded sheet is initiated by calculating proper amounts of material—in terms of the ratio of conductive particles to display elements and/or non-conductive particles, as detailed above (at 802). Once the proper amounts of particles are obtained, the particles are mixed together in a random fashion, as will be apparent to those of skill in the art (step 804). The mixture is then extruded into a sheet in well known manners (at 806).

At this point, the extruded sheet is processed to achieve the desired percolation threshold gradient in the sheet (at 808). As described above, this can be accomplished in a variety of different manners. For example, if the concentration of conductive particles is above the percolation threshold (at 810), then the surfaces of the extruded sheet are cooled at the same rate (at 812) and a plasticizer is applied to the first side or surface of the sheet. As noted above, the plasticizer will swell the sheet, or absorb, to form the first region of the sheet by breaking the conductive matrix therein.

Referring back to step 808, an alternative way to achieve the percolation threshold gradient sheet is implemented where the concentration of conductive particles is below the percolation threshold (at 810'). In this case, both surfaces of the extruded sheet are cooled at the same rate (at 812') and pressure is applied to the second surface of the sheet to form the second region of the sheet having a more dense distribution of conductive particles.

A still further alternative for processing the extruded sheet may be used where the concentration of conductive particles is less than the percolation threshold (at 810'). In this case, a surface of the sheet may simply be cooled more slowly than the other surface of the sheet (at 812"). For example, the second surface 116 of the sheet may be cooled more slowly that the first surface 112. As noted above, this will result in a desired percolation threshold gradient.

The extrusion and processing techniques noted above necessarily involve control of process temperature. However, the temperatures involved and any temperature gradients used or observed will vary from process to process. For example, the materials used are a factor in temperature control. In this regard, if a polymer material is used as non-conductive particles, temperatures may be controlled based on the melting point of the polymer and its percent crystallinity.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An electric paper apparatus comprising:
   conductive particles;
   nonconductive particles; and,
   display elements;
   wherein the conductive particles, nonconductive particles and the display elements are randomly positioned in an extruded sheet such that a first ratio of the conductive particles to at least one of the nonconductive particles and the display elements in a first region associated with a first surface of the sheet is below a percolation threshold and a second ratio of the conductive particles to at least one of the nonconductive particles and the display elements in a second region associated with a second surface of the sheet is above the percolation threshold.

2. The apparatus as set forth in claim 1 wherein the conductive particles comprise carbon nanotubes.

3. The apparatus as set forth in claim 1 wherein the conductive particles comprise Indium Tin Oxide (ITO) particles.

4. The apparatus as set forth in claim 1 wherein the nonconductive particles comprise transparent material.

5. The apparatus as set forth in claim 1 wherein the nonconductive particles comprise polymer material.

6. The apparatus as set forth in claim 1 wherein the nonconductive particles comprise elastomer material.

7. The apparatus as set forth in claim 1 wherein the display elements are bi-stable and comprise microencapsulated elements that are responsive to electric fields.

8. The apparatus as set forth in claim 1 wherein the display elements comprise microencapsulated bichromal spheres.

9. The apparatus as set forth in claim 1 wherein the conductive particles at the first surface of the sheet are operative as charge retaining islands.

10. The apparatus as set forth in claim 1 wherein at least some of the conductive particles in the second region of the sheet form a conductive matrix and are operative as a ground plane.

11. A method of forming an electric paper apparatus comprising:
mixing conductive particles, nonconductive particles and display elements in selected amounts to obtain a mixture of disordered particles;
extruding the mixture into a sheet; and,
processing the sheet such that first and second ratios of the conductive particles to at least one of the nonconductive particles and the display elements are obtained, the first ratio of the conductive particles to the at least one of the nonconductive particles and the display elements, in a first region associated with a first surface of the sheet, being below a percolation threshold and a second ratio of the conductive particles to the at least one of the nonconductive particles and the display elements, in a second region associated with a second surface of the sheet, being above the percolation threshold.

12. The method as set forth in claim 11 further comprising calculating the selected amounts.

13. The method as set forth in claim 12 wherein the selected amounts are calculated so that an amount of the conductive particles is below the percolation threshold.

14. The method as set forth in claim 13 wherein the processing comprises controlling a temperature gradient to allow the second surface of the sheet to cool more slowly than the first surface of the sheet to form the second region.

15. The method as set forth in claim 13 wherein the processing comprises cooling the first surface of the sheet and the second surface of the sheet at substantially the same rate and applying pressure to the second surface of the sheet to form the second region.

16. The method as set forth in claim 12 wherein the selected amounts are calculated so that an amount of the conductive particles is above the percolation threshold.

17. The method as set forth in claim 16 wherein the extruded sheet includes a conductive matrix of the conductive particles and wherein the processing comprises cooling the first surface of the sheet and the second surface of the sheet at substantially the same rate to temporarily maintain the conductive matrix in the sheet and coating the first side of the sheet with a plasticizer to selectively swell the sheet to form the first region by breaking the conductive matrix therein.

* * * * *